US006450429B1

(12) United States Patent
Kirjavainen

(10) Patent No.: US 6,450,429 B1
(45) Date of Patent: Sep. 17, 2002

(54) METHOD AND APPARATUS FOR TREATING WASTE MATERIAL

(75) Inventor: Kari Kirjavainen, Espoo (FI)

(73) Assignee: Conenor Oy, Espoo (FI)

( * ) Notice: Subject to any disclaimer, the term of this patent is extended or adjusted under 35 U.S.C. 154(b) by 0 days.

(21) Appl. No.: 09/463,729

(22) PCT Filed: Aug. 31, 1998

(86) PCT No.: PCT/FI98/00676

§ 371 (c)(1), (2), (4) Date: Feb. 29, 2000

(87) PCT Pub. No.: WO99/11374

PCT Pub. Date: Mar. 11, 1999

(30) Foreign Application Priority Data

Sep. 1, 1997 (FI) .......... 973576

(51) Int. Cl.[7] .......... B29C 47/52

(52) U.S. Cl. .......... 241/261.1; 241/67; 241/293

(58) Field of Search .......... 241/23, 67, 261.1, 241/293, 297

(56) References Cited

U.S. PATENT DOCUMENTS

| | | | | |
|---|---|---|---|---|
| 4,104,958 A | * | 8/1978 | Manser et al. | 99/355 |
| 4,422,372 A | * | 12/1983 | Hoezee | 99/353 |
| 4,874,136 A | * | 10/1989 | Webster | 241/251 |
| 5,085,735 A | * | 2/1992 | Nilsson | 162/26 |
| 5,152,871 A | * | 10/1992 | Gullichsen | 162/23 |
| 5,253,814 A | * | 10/1993 | Pujol | 241/171 |
| 5,346,145 A | * | 9/1994 | Kamiwano et al. | 241/172 |
| 5,379,952 A | * | 1/1995 | Geiger | 241/65 |
| 5,383,809 A | * | 1/1995 | Paoli | 452/138 |
| 5,996,914 A | * | 12/1999 | Stehr | 241/171 |
| 6,073,657 A | * | 6/2000 | Hippelainen et al. | 138/125 |
| 6,086,239 A | * | 7/2000 | Jarvenkyla et al. | 366/76.1 |
| 6,187,237 B1 | * | 2/2001 | Kirjavainen et al. | 264/173.6 |

FOREIGN PATENT DOCUMENTS

| | | |
|---|---|---|
| WO | 9721532 | 6/1997 |
| WO | 9728949 | 8/1997 |

* cited by examiner

*Primary Examiner*—Allen Ostrager
*Assistant Examiner*—William Hong
(74) *Attorney, Agent, or Firm*—Ladas & Parry

(57) ABSTRACT

A method and an apparatus for treating waste material. The apparatus has a conical rotatable rotor (3) placed between stators (1, 2). At least the stators (1, 2) have recesses (9) from which the material in the apparatus can be discharged when the rotor (3) is rotating. The rotor (3) has several openings (8*a*, 8*b*) in the axial direction of the apparatus through which openings at least some of the waste material passes. The edges of the recesses (9) and the openings (8*a*, 8*b*) of the rotor (3) are sharp so that the waste material supplied to the apparatus is ground by means of the sharp edges when it passes through the openings (8*a*, 8*b*).

10 Claims, 2 Drawing Sheets

METHOD AND APPARATUS FOR TREATING WASTE MATERIAL

FIELD OF INVENTION

The invention relates to a method for treating waste material, in which method waste material is supplied to an apparatus where a conical rotor is placed between stators, and whereby at least the stators have recesses by means of which the material can be transferred through the apparatus when the rotor is rotated, and which rotor has several openings in the axial direction, in which case at least some of the material is conducted through the openings.

The invention further relates to an apparatus for treating waste material, which apparatus comprises a conical rotatable rotor placed between stators, whereby at least the stators have recesses by means of which waste material moves through the apparatus when the rotor is rotated, and which rotor has several openings in the axial direction through which openings at least some of the material is arranged to pass.

BACKGROUND OF INVENTION

WO 97/21532 discloses an apparatus where a conical rotor is placed between two stators. Helical grooves are arranged in the rotor and/or the stator for extruding the material to be extruded from the extruder when the rotor rotates. Furthermore, an opening or openings are arranged in the travel of the rotor, through which openings at least some of the material to be extruded is arranged to flow. The material to be extruded is made homogenous by means of the apparatus, but the treatment of waste material is inefficient with this apparatus. By arranging a sharp pitch angle for the grooves of the rotor, the material will be ground to some extent at the nozzle of the supply conduit, but this kind of a solution cannot be applied efficiently to the treatment of waste material.

Finnish Patent Application 960,589 also discloses an apparatus where a conical rotor is arranged between two stators. At the nozzle of the supply conduit, the rotor has openings through which at least some of the material to be supplied can flow. By arranging the opening to be oblique, the cutting of fibres of the material to be extruded can be increased, but the apparatus of the reference cited is inefficient for the treatment of waste material.

SUMMARY OF INVENTION

The object of the present invention is to attain a method and an apparatus with which waste material can be treated efficiently.

The method of the invention is characterized in that the edges of the recesses and the openings of the rotor are sharp, in which case the waste material is conducted through the openings in such a manner that the waste material is ground by means of the sharp edges.

Further, the apparatus of the invention is characterized in that the edges of the recesses and the openings of the rotor are sharp in such a manner that the material passing through the openings is ground by means of the sharp edges.

The essential idea of the invention is that the apparatus has at least one conical rotor placed between two stators and at least the stator has recesses by means of which the material in the apparatus can be discharged when the rotor rotates. A further essential idea is that in the axial direction of the apparatus, the rotor has several openings through which the material to be treated is arranged to pass and that the edges of the openings and of the recesses of the stator are sharp to the effect that the material to be supplied is ground when it passes through the openings of the rotor. The idea of one preferred embodiment is that the recesses of the stator are at least partly discontinuous to the effect that when a recess ends, the material to be treated is forced through the opening of the rotor. The idea of a second preferred embodiment is that the rear end of the apparatus has recesses that transfer material outwards, which recesses lead to the outlet nozzle of the apparatus and which recesses are arranged into a sharp angle and the flights between the recesses are arranged to be so low that some of the material passes over the flights. The idea of a third preferred embodiment is that cooling means are arranged to the apparatus for cooling the material to be treated in the apparatus.

An advantage of the invention is that waste material, such as rubber, PEX, leather or textile waste, can be ground and treated efficiently. By arranging some of the material to pass over the flight between the recesses, the waste material at the flight can be grated into a smaller form. It can be ensured by cooling that the waste material will retain its powdery form.

BRIEF DESCRIPTION OF THE DRAWINGS

The invention will be explained in more detail in the appended drawings wherein.

DETAILED DESCRIPTION

Figure 1:
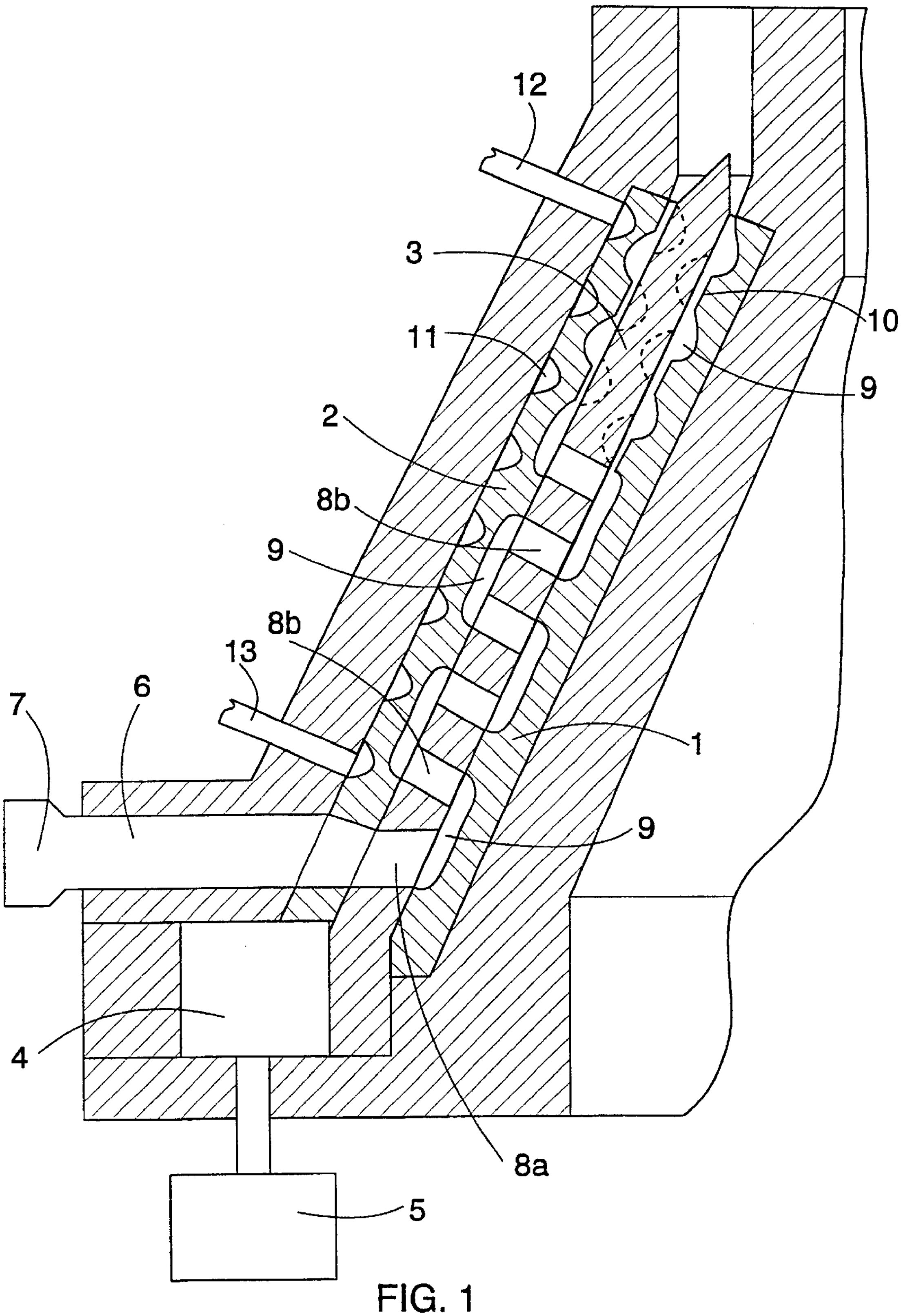
FIG. 1 is a schematic sectional side view of one apparatus of the invention.

FIG. 1 is a sectional side view of the apparatus of the invention. The apparatus comprises an inner stator 1 and an outer stator 2 arranged outside it. At least the outer surface of the inner stator 1 and the inner surface of the outer stator 2 are conical. A conical rotor 3 is arranged between the inner stator 1 and the outer stator 2. The rotor 3 is arranged to move rotatably between the inner stator 1 and the outer stator 2. The rotor is rotated with a motor 5. The motor 5 can be a hydraulic motor or an electric motor, for example, or any other motor known per se suitable for the purpose. The motor 5 is arranged to rotate the rotor 3 by a gear system 4. By means of the gear system 4, the speed of rotation of the rotor 3 can be adjusted as required. But the gear system 4 is not, however, necessary when using an electric motor, for example, as the speed of rotation of the rotor 3 can be easily adjusted by regulating the speed of rotation of the motor 5 in a manner known per se.

The apparatus is further provided with a supply conduit 6 along which the material to be treated can be fed to the apparatus. The material to be fed to the supply conduit 6 is supplied with a feeding device 7. The feeding device 7 can be a feed screw or a pump, for example, or any other device known per se. The flow rate of the material to be supplied to the supply conduit can be adjusted by means of the feeding device.

The material to be treated flows from the supply conduit 6 through a feed opening **8*a* to the interior of the rotor 3. After this the material passes in a recess 9 in the inner stator 1 when the rotor 3 rotates outwards from the apparatus, that is, upwards in FIG. 1. From the recess 9 the material gains access through an opening 8*b* outside the rotor and there in a recess in the outer stator 2 further outwards from the apparatus. The recesses 9 are arranged to end in such a manner that substantially all the material to be treated can be made to move through the openings 8***b* while a recess always ends on the other side of the rotor 3. The edges of the openings 8*a* and 8*b* of the rotor 3 are arranged to be sharp and similarly, the edges of the recesses 9 are arranged to be sharp in such a manner that when the material to be treated moves through the openings 8*a* and 8*b*, the sharp edges of the openings 8*a* and 8*b* and the recesses 9 cut and grind the material to be treated at the boundary surface of the rotor 3 and the stators 1 and 2 in such a manner that the material will be ground.

At the rear end of the apparatus, that is, at the end where the material to be extruded is discharged from the apparatus, the recesses 9 are arranged to continue as far as the outlet nozzle of the apparatus and the recesses 9 are helical. In this part, flights 10 between the recesses 9 are arranged to be so low that such a large clearance remains between the flights 10 and the rotor 3 that some of the material to be treated can pass over the flight 10 from one recess to another. In that case the material to be treated will be grated into a smaller form at the flight 10. If the material under treatment is rubber, for example, and a small amount of solvent oil is mixed into the material, a rubber particle can be made to grate open at the flight 10. The rear end of the apparatus can also have helical recesses in the rotor 3, which is illustrated in FIG. 1 by means of broken lines. In the rotor 3 the recesses are in the opposite direction to those in the corresponding stators 1 and 2, that is, the helical recesses 9 are crossing, in which case the effect of the recesses on the material is considerable.

It is also possible to arrange to the apparatus cooling means, such as a cooling channel 11 by means of which the apparatus and the material treated there can be cooled so that it will retain its powdery form and not get stuck onto the inner surfaces of the apparatus. By supplying a cooling medium to the cooling channel 11 through an inlet channel 12 situated close to the rear end of the apparatus and by conducting the cooling medium out along an outlet channel 13 situated at the front end of the apparatus, the rear end of the apparatus can be cooled more efficiently and heat can be transferred from the rear end of the apparatus towards the front end of the apparatus. FIG. 1 shows cooling means arranged to the outer stator 2 but when required, cooling means can also be arranged to the inner stator 1.

Figure 2:
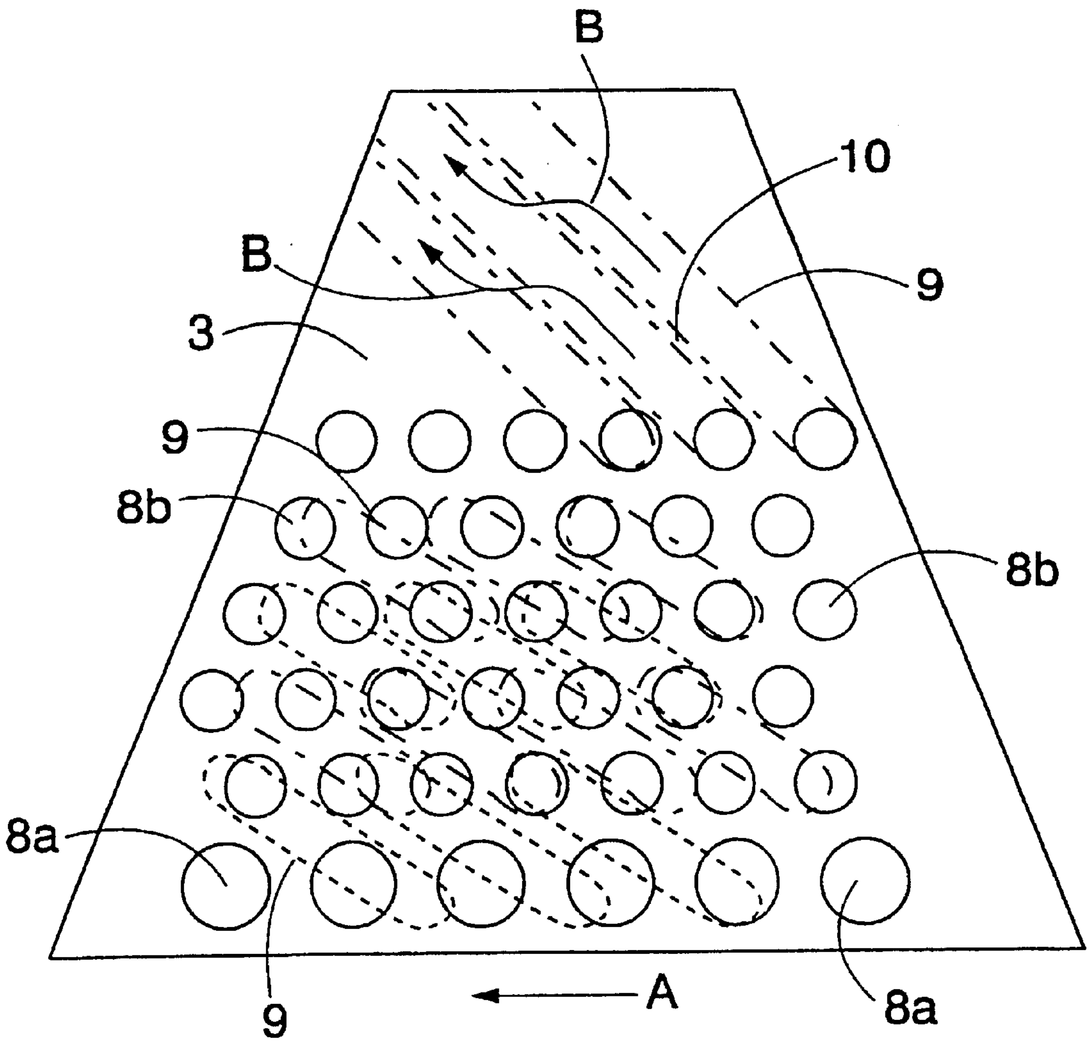
FIG. 2 is a side view of the rotor of the apparatus of the invention.

FIG. 2 shows the rotor 3 of the apparatus as in FIG. 1. The rotor 3 is rotated in the direction of arrow A. For the sake of clarity, FIG. 2 shows only some of the openings 8*a* and 8*b* of the rotor 3. The openings 8*a* and 8*b* are naturally distributed evenly around the whole rotor 3. FIG. 2 shows the recesses 9 in the inner stator 1 by a broken line and the recesses 9 in the outermost stator 2 are described by a line of dots and dashes. At the front end of the apparatus, the recesses 9 are discontinuous and oval and placed obliquely. In that case, the recesses 9 move the material to be treated outwards from the apparatus when the rotor 3 rotates, that is, upwards in FIG. 2, and force the material through the openings 8*b* when they end. At the rear end of the apparatus, the recesses 9 continue as far as the outlet point of the apparatus. For the sake of clarity, FIG. 2 does not show the recesses in the inner stator 1 at the rear end of the apparatus. At this end, the flights between the recesses 9 are so low that some of the material can pass over the flights 10 from one recess to another, as illustrated by arrows B. At this point, the pitch angle of the recesses 9, that is, the angle with respect to the horizontal level is rather sharp, such as about 45°, in which case the flow over the flights 10 can be made reasonably great. The pitch angle cannot, however, be too sharp in order that the recesses 9 will transport material all the time outwards and too high counterpressure will not be produced.

The apparatus can be easily constructed of separable parts placed on top of one another, in which case it is easy to assemble and disassemble and maintain the apparatus. Further, the stators 1 and 2 can be formed as in FIG. 1 of separate parts so that the surfaces which are against the rotor 3 and subject to wear can be changed separately.

Many different types of waste material, such as rubber, PEX, leather or textile waste, can also be treated with the apparatus of the invention. It is also possible to supply some polymer along with waste material into the apparatus. Then the apparatus is not cooled but it is possible to make an extrusion product containing waste material and polymer, such a tube, a film or a cable sheath or other such product. If the waste material is PEX, crosslinked PEX particles can be oriented at the rear end of the apparatus when passing over the flights 10 as in this place the particles are close to their softening point.

The openings in the rotor 3 help to equalize the pressures of different heights on different sides of the rotor 3, for which reason no heavy constructions are required for mounting the apparatus in bearings and for power transfer. By moving the rotor 3 in the axial direction, the clearances between the stators 1 and 2 and the rotor 3 can be adjusted easily and simply in the conical solution.

It is easy to adjust the amount to be supplied to the apparatus by means of the feeding device 7. The feeding can be made in such a manner that not an equal amount of material to be treated is fed as there is capacity in the apparatus for treatment, but so-called undersupply is used, in which case the rate of feeding can be easily adjusted and an optimum loading situation can be found for the apparatus. Undersupply can be realized also pulse-like to the effect that a full amount of the material to be treated is supplied through certain supply openings and some of the supply openings are left partially or totally empty so that the material to be treated is distributed substantially evenly all over the apparatus. The speed of rotation of the rotor is also easy to adjust, in which case it is very easy to regulate the temperature of the material to be treated by adjusting the speed of rotation of the rotor and flow rate of the material to be supplied.

The drawings and the specification relating thereto are only meant to illustrate the idea of the invention. In its details, the invention may vary within the scope of the claims. In that case, at the rear end of the apparatus, the recesses 9 can be arranged either to the stators or the rotor, or to both. Further, there may be more than one rotor and more than two stators in the apparatus.

What is claimed is:

1. An apparatus for treating waste material supplied to the apparatus, the apparatus comprising at least one conical rotor and at least two stators, at least the stators having recesses and the at least one conical rotor having a plurality of openings each of which passes through the at least one conical rotor, the recesses and the plurality of openings having respective sharp edges, the at least one conical rotor being disposed between the at least two stators such that, upon rotation of the rotor, at least a portion of waste material supplied to the apparatus flows between respective of the plurality of openings and the recesses and past the respective sharp edges of the recesses and the plurality of openings in a path that subjects the portion of waste material to cutting and grinding by the respective sharp edges.

2. The apparatus according to claim 1, wherein the recesses are discontinuous in at least a part of the apparatus, said discontinuous recesses being disposed to force the portion of the waste material through the plurality of the openings.

3. The apparatus according to claim 1, wherein the apparatus comprises a front end and a rear end, the rear end comprising a plurality of the recesses, said plurality of the recesses being disposed with a flight therebetween, the edges of the plurality of the recesses of the rear end being disposed at an angle and the flight being disposed with respect to the at least one conical rotor at a distance that permit at least some of the waste material to pass over the flight from a first of the plurality of recesses of the rear end to a second of the plurality of recesses of the rear end.

4. The apparatus according to claim 1, further comprising means for cooling the apparatus.

5. The apparatus according to claim 1, wherein the apparatus comprises a front end and a rear end, a portion of the at least one conical rotor and portions of the at least two stators in the rear end of the apparatus each comprising helical recesses, the helical recesses in the portion of the at least one conical rotor in the rear end of the apparatus having a directional disposition that is opposite to a directional disposition of the helical recesses in the portion of the at least two stators in the rear end of the apparatus.

6. A method for treating waste material comprising:

a) providing the apparatus of claim 1, b) supplying waste material to the apparatus;

c) rotating the at least one conical rotor to cause at least a portion of the waste material to flow between respective of the plurality of openings and the recesses and past the respective sharp edges of the recesses and the plurality of openings such that at least the portion of the waste material is cut and ground.

7. The method for treating waste material according to claim 6, wherein the apparatus comprises a front end and a rear end, the front end comprising a plurality of said recesses, each of said plurality of recesses having an end that is disposed with respect to respective ones of the plurality of openings such that waste material passing through said plurality of recesses is forced through the plurality of openings of the rotor.

8. A method for treating waste material comprising:

a) providing the apparatus of claim 3;

b) supplying waste material to the apparatus;

c) rotating the at least one conical rotor to cause at least a portion of the waste material to flow between respective of the plurality of openings and the recesses and past the respective sharp edges of the recesses and the plurality of openings such that at least the portion of the waste material is cut and ground.

9. The method according to claim 6, further comprising cooling the apparatus.

10. The method according to claim 6, further comprising supplying polymer to the apparatus simultaneously with the supplying of the waste material, and extruding from the apparatus a product containing the waste material and the polymer.

* * * * *